United States Patent
Benn

Patent Number: 5,096,591
Date of Patent: Mar. 17, 1992

[54] SPIRALLY, WOUND FILTER CARTRIDGE, APPARATUS SYSTEM AND METHOD OF MANUFACTURE AND USE

[76] Inventor: James A. Benn, 29 Academy St., Arlington, Mass. 02174

[21] Appl. No.: 580,955

[22] Filed: Sep. 11, 1990

Related U.S. Application Data

[63] Continuation-in-part of Ser. No. 518,811, May 4, 1990.

[51] Int. Cl.$^5$ .................................. B01D 63/10
[52] U.S. Cl. ...................... 210/651; 210/247; 210/321.83; 210/487; 210/494.1
[58] Field of Search ............ 210/DIG. 17, 321.83, 210/640, 487, 247, 494.1, 651, 652

[56] References Cited

U.S. PATENT DOCUMENTS 2,185,281  1/1940  Tear ........................ 210/DIG. 17
4,299,702  11/1981  Bairinji et al. ............. 210/321.83

*Primary Examiner*—Frank Spear
*Attorney, Agent, or Firm*—Richard P. Crowley

[57] ABSTRACT

A spirally wound ultrafiltration filter cartridge system and method which comprises a membrane sheet material forming a closed loop having a one end and an other end with first and second open spacer sheet materials, the membrane sheet material and spacer sheet material wrapped about a perforated center tube, the membrane sheet material sealed at either end by solid resin headers, the filter cartridge forming spirally wound permeate and concentrate flow channels and having a tangential, elongated feed inlet on the exterior surface of the filter cartridge. A concentrate stream is removed from the center tube and a permeate stream is removed from the one end of the closed loop of the membrane sheet material. The method of manufacture comprises spirally winding the closed end loop sheet material and the spacer sheet material about a perforated center tube and sealing either end of the membrane sheet material with a ptting resin.

22 Claims, 1 Drawing Sheet

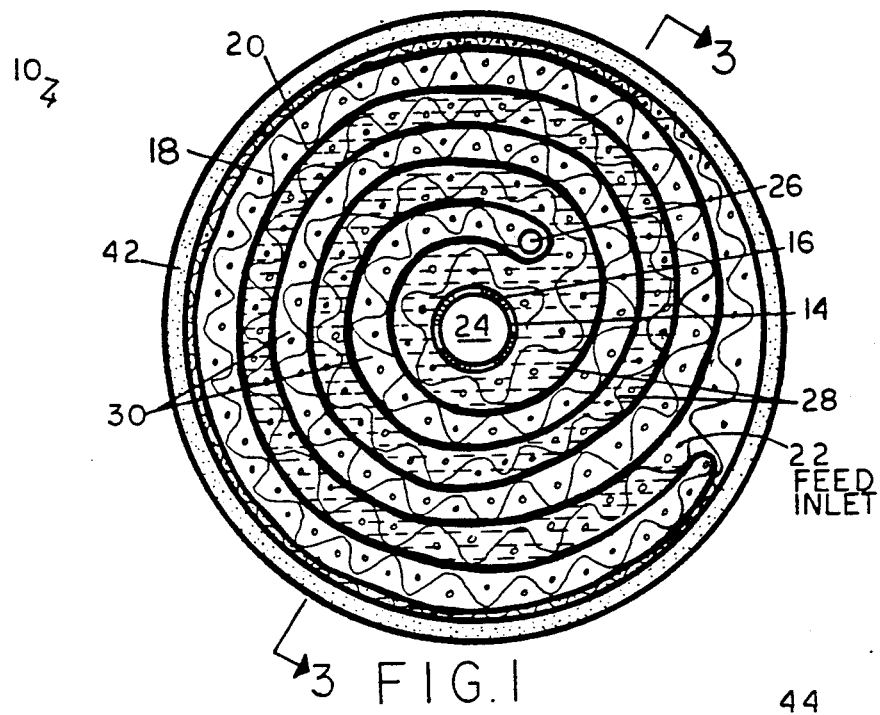
FIG. 1
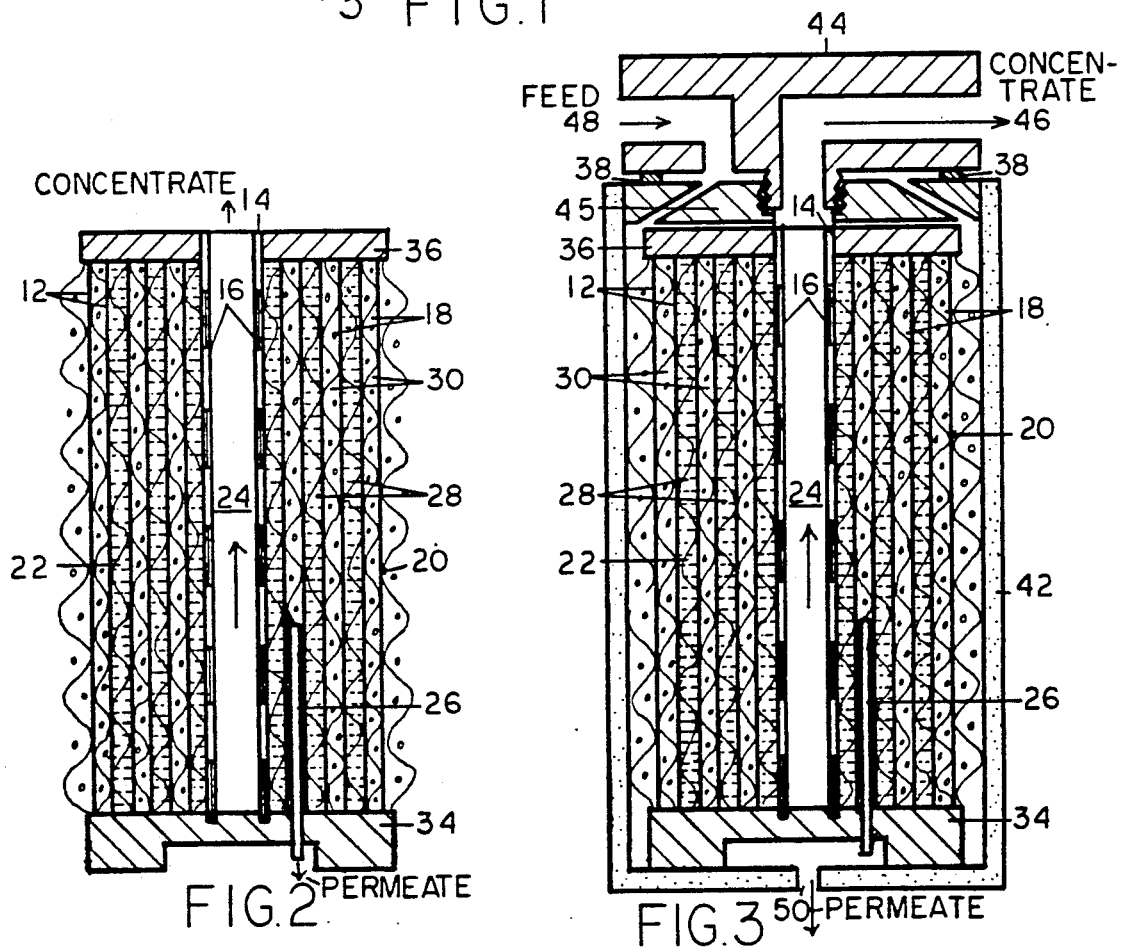
FIG. 2
FIG. 3

SPIRALLY, WOUND FILTER CARTRIDGE, APPARATUS SYSTEM AND METHOD OF MANUFACTURE AND USE

REFERENCE TO PRIOR APPLICATION

This application is a continuation-in-part patent application of U.S. Ser. No. 07/518,811, filed May 4, 1990, LIQUID SEPARATION AND CLARIFICATION SYSTEM. The parent application is directed to an ultrafiltration apparatus and method particularly for the filtration of high solids-containing, petroleum solvent and water waste effluent from cleaning ink printing press blankets.

BACKGROUND OF THE INVENTION

In traditional filtration equipment, fluid to be filtered is recirculated through a filter element containing filtration membranes where the fluid is driven parallel to the membrane to permit the membrane to purify fluid as it passes through the membrane, and to provide a scrubbing action on the surface of the membrane to remove built-up solids that have been filtered out of the fluid by the membrane. These filter elements typically have one inlet where the raw fluid is introduced, and two outlets, one where the raw recirculating fluid exits and another where the purified fluid exits.

Many different configurations of ultrafiltration filter elements have been developed which provide this crossflow cleaning action. One type of filter element, called a "spiral" type of filter element, is made of flat sheets of filter material that are made into pouches that are wound into a spiral shape around a porous or perforated center tube. The feed fluid to be filtered enters one end of the filter element and flows parallel to the cylindrical axis of the filter to exit at the other end of the filter as a concentrate stream. The filtered or permeate fluid collects in the pouches and passes in a spiral manner to the center tube for collection. This type of "spiral" design is used currently by many companies to construct both ultrafiltration as well as reverse osmosis filter elements.

Major problems with this type of filter element are that they are expensive to manufacture and cannot be easily mounted on or dismounted from a piece of filtration equipment. In the typical well-known state-of-the-art manufacturing process, individual flat sheets are positioned on a table top, urethane or epoxy adhesive is applied around the perimeters of the alternate sheets, and they are then manually rolled around a center tube to create spiral-shaped pouches hydraulically connected to the center tube. Upon drying of the adhesive, the ends of the rolled filter element are trimmed to remove excess adhesive and open the spaces between the individual pouches to allow the fluid to be filtered to enter the ends of the filter element. Not only is this a slow manual manufacturing process, but also often, when trimming the excess adhesive from the ends of the filters, the pouches can be accidentally ruptured, rendering the filter element useless. Therefore, usually extensive leak testing must be performed on the filter elements before they are released to the customer.

In current, commercial practice, these filters are mounted on a filtration system by being inserted into a filter housing, which is then screwed onto a hydraulic fitting on the filtration system. Fluid to be filtered enters the top of the filter element and flows axially through the filter element to exit at the bottom of the filter. Fluid that has been filtered enters the spirally wound pouches and flows spirally to the center tube for collection.

When the filter element needs changing, the housing must be dismounted from the filtration system and the filter element manually removed from the housing. This results in considerable spillage and operator exposure to the fluid being filtered, where this fluid may be hazardous to the operator and equipment.

It is desirable therefore to provide a spiral wound filter apparatus and method of manufacturing the filter apparatus, which filter apparatus is easily and inexpensively manufactured and wherein the spiral wound filter cartridge used in the filter apparatus can be easily mounted and dismounted on conventional filter apparatuses by an unskilled operator and with minimum contact with any potentially hazardous fluids being filtered. It is desired to provide a method of filtration particularly for the filtration of hazardous solvent or water waste solutions like ink printing blanket waste solution comprising ink and other particles, petroleum solvent and water.

SUMMARY OF THE INVENTION

The invention relates to a spiral wound filter apparatus and a method of manufacturing and using the filter apparatus.

The invention relates to a filter apparatus comprising a container and a filter cartridge within the container for the separation of a feed stream, such as, but not limited to a printing ink blanket waste effluent stream, into a permeate stream and a concentrate stream. The filter apparatus comprises a perforated or porous center tube for the withdrawing of a concentrate stream and membrane sheet material, particularly an ultrafiltration membrane sheet material, for example, having membrane pores of less than about 0.5 microns for the separation of the feed stream into the concentrate stream and the permeate stream with the membrane sheet material typically formed in a closed loop. The filter apparatus also includes a porous spacer, screen-type sheet material within the loop of the sheet membrane material to separate the sheet membrane material and also on the outside of the sheet membrane material, to form spirally wound feed concentrate flow path and permeate flow path about the center tube, that is, to form a spiral permeate flow channel and a spiral concentrate flow channel about the center perforated tube.

The filter apparatus includes a tangential, elongated feed inlet comprising the open end of the spiral formed by the loop of the sheet material on the exterior, cylindrical surface of the filter cartridge for the tangential introduction of the feed stream into the concentrate flow path channel. First and second end headers are employed at one and the other end of the spirally wound spacer, typically of potted resin, to seal the spirally wound peripheral edges of the filter cartridge. The filter apparatus includes a permeate outlet means extending into the permeate flow channel, typically through the first or second or both end headers, for the withdrawal of a permeate stream from the filter cartridge. The filter apparatus includes a center perforated tube having at least one open end and extending through at least the one or second header end or both for the withdrawal of a concentrate stream from the filter cartridge. Optionally, as described, the woven screen material employed to form the concentrate and permeate flow channels may be wound around the exterior surface of the filter cartridge to form an exterior screen wraparound so that the filter cartridge may be snugly fit into the cylindrical container of the filter apparatus.

Traditional liquid filter apparatuses are designed to capture contaminants and let the liquid of the feed stream pass through. Generally, the quantity of solid contaminants in the feed stream are small and a small amount of filter material can be used for filtering large fluid quantities before saturation or plugging of the filter material or ultrafiltration membrane surface occurs. However, some liquid feed stream requiring filtration contain a high level of contaminants which very quickly saturate or plug filter material in conventional filter apparatuses. The present filter apparatus relates to a novel design of a new filter apparatus which is spirally wound and contains a large amount of filter membrane material in a small space and is inexpensively and easily manufactured to enable economic filtration of particularly fluids with a high level of contaminants, such as the filtration of aqueous, petroleum solvent cleaning solutions for printing presses. The ink printing press blanket wash waste solution typically is derived when the solvent is applied to paper handling parts of the press. The solvent dissolves and carries away dried ink and paper debris. The solvent can be cleaned for reuse if the ink and paper debris are removed from the solvent. One method of cleaning the solvent from such waste effluent streams is by distillation.

The parent application describes the employment of a hollow fiber filter membrane to effect cleaning by filtration of the waste effluent stream. The present filter apparatus and cartridge is particularly adapted for the use in filtration of the printing ink blanket wash waste effluent streams; however, it is recognized that the present filter apparatus and cartridge may be adopted and used for a wide variety for filtering operations and which also require ultrafiltration. It is particularly useful where the filtration fluid is hazardous, and the filter cartridge needs to be changed periodically, quickly and preferably without contact of the waste solution with the hands of the operator.

In the operation of the filter apparatus, fluid to be filtered enters the filter cartridge, at the external, tangential, elongated feed opening of the permeate flow channel on the external surface of the cylindrical filter cartridge. The feed stream continues throughout a spiral, concentrating flow path toward the center of the spiral and then is removed through a concentrate perforated center tube. The feed fluid is typically pressured, from example, from 5 psi to 30 psi or higher where the cartridge is employed in ultrafiltration, and typically from 15 psi to 22 psi so that the concentrate passes across the filtration membrane on either side of the flow channel where it enters the spirally wound permeate flow path and proceeds to the permeate outlet tube generally centrally disposed and adjacent the center tube where it is withdrawn. The screen materials maintain the flow spaces between the spirally wound filter material to create the spirally wound concentrate and permeate flow paths about the center tube and permeate outlet tube.

The internal flow characteristics of the filter apparatus are different from the typical, commercially available, spirally wound filter elements in that the feed stream to be filtered enters the filter apparatus from the external cylindrical surface by tangential entry along the entire longitudianl surface, and then spirals around within the filter cartridge for exit through the center tube at either one or the other end or both. In the operation of an ultrafiltration apparatus, typically the inlet pressure as stated may range from about 5 psi to 30 psi or more while the outlet pressure is essentially 0 psi to 10 psi or more. A wide variety of materials may be employed as the membrane sheet material to prepare the filter, but more typically comprises an ultrafiltration or reverse osmosis membrane sheet material having fine pores. One suitable ultrafiltration material would comprise a porous, nylon 66-type material having a thickness of from about 2 mils to 10 mils, but more particularly 5 mils to 6 mils, and having an average micron pore size of about 0.1 to 0.2 or less. The spacer separating material employed on both sides of the filter sheet material generally comprises a very open mesh-type, resilient, screen-type material to form the spirally flow channels and typically may be comprised of a non-corrosive-type material, such as a plastic material, like an olefinic resin or polyethylene or polypropylene. The screen-type material may very in size, but typically should be open enough to permit the generally unimpeded flow of the permeate or concentrate stream, and generally is molded or formed in a semi-rigid manner in an over-under molded or woven-type arrangement. The screen-type material may range in thickness from 5 mils to 30 mils, particularly 12 mils to 20 mils, which amount substantially represents the size of the respective concentrate and permeate flow channels.

In the use of the filter cartridge within the filter container of the apparatus for the treatment of a printing press blanket waste effluent as feed stream, i.e. containing 1% to 10% by weight of solid particles and comprising a petroleum solvent, with an ultrafiltration surface membrane of about 10 feet$^2$, the recirculation flow rate is about 1.5 gallons per minute, while the permeate flow rate is about 0.05 gallons per minute. The feed pressure from the outside of the cylindrical filter cartridge keeps the flow channels narrow so that there is a good membrane surface scrubbing action by the fluid as the feed stream spirally winds through the flow channels.

The filter cartridge and apparatus of the invention may be easily and inexpensively manufactured. The filter cartridge is prepared by forming a closed loop of the ultrafiltration sheet membrane material. Of course, if desired, rather than having the entire loop made of ultrafiltration or filtration sheet material one side of the material may be a non-porous sheet material so that the loop would comprise adjacent, spaced apart sheets, one of a filtration sheet material and the other of a non-porous or different type filtration sheet material, with both ends connected and sealed, such as by adhesive sealing of the edges or by a plug.

However, in one preferred embodiment, a sheet of ultrafiltration membrane material is formed into a flattened loop, and a spacer screen-type material is then placed within the loop to form the permeate channel. A spacer screen optionally of the same or different type is then placed on the outside surface of the flattened loop of the filtration sheet material to form the concentrate flow channel. A permeate outlet tube is inserted within the loop at one end, and then the screen and the membrane loop material with the internal screen are merely rolled about the perforated center tube into a spiral form and with the extending free end of the screen material from within the concentrate channel wrapped around the outside of the filter cartridge to provide for a snug fit within the selected filter container. Each end of the spiral wound cartridge is then dipped in a potting resin, such as a quick hardening epoxy or urethane resin, to form a resin end header, and then the entire filter cartridge is inserted into a cylindrical container to form the filter apparatus of the invention.

The perforated permeate tube is merely potted in place with the potting resin to extend adjacent the central tube, and thus desirably can be inserted next to the central tube prior to rolling up the sheet material, or in fact, the central tube may be cut away in a certain portion and the concentrate discharge tube may be made a part of the central permeate tube, but is within the end of the loop of the ultrafiltration sheet material. When the ends of the wound spiral are formed, they are sequentially dipped into the hardenable liquid urethane or epoxy resin to form the end caps, the central tube and the permeate tube are temporarily blocked to prevent them from filling with the resin. The formation of the end caps creates passages for the feed stream to be filtered to enter the outside cylindrical surface of the spiral within the filter container and to exit by way of the permeate withdrawal tube. This method of manufacture and assembly avoids the tedious and exacting manual job of applying adhesive around the perimeter of individual sheet materials as in typical spiral membrane modules, and also avoids the need to trim the ends of the spiral subsequent to winding of the spiral elements.

The filter cartridge is easily incorporated into a disposable container to form the filter apparatus, and that allows fast and safe mounting and dismounting of the filter apparatus onto a standard ultrafiltration or other filtration equipment. The filter apparatus thus resembles in shape and use the familiar screw-type, spin-on filters used to filter oil in automobile engines with the addition of a connection that is a permeate discharge on the bottom of the filter element to remove the permeate feed stream. The filter apparatus is desirable in that it can be mounted and dismounted on a filtration system by an unskilled operator merely by screwing on to the screw on-type or other mounting of standard filtration systems where the operator can minimize contact with any potentially hazardous fluids being filtered. In addition, the automatic low cost and high reliability methods used currently to manufacture oil filters can be easily modified to manufacture at very low cost the filter cartridge and filter apparatus of the invention.

The invention will be described for the purposes of illustration only in connection with certain embodiments; however, it is recognized that various changes, modifications, additions and improvements may be made in the illustrated embodiments by those persons skilled in the art, all falling within the spirit and scope of the invention.

BRIEF DESCRIPTION OF THE DRAWINGS

FIG. 1 is a top plan, sectional view of the filter apparatus of the invention;

FIG. 2 is a sectional view of the filter cartridge shown in FIG. 1; and

FIG. 3 is the filter system of the invention and showing in a sectional view along lines 3—3 the use of the filter apparatus of FIGS. 1 and 2.

DESCRIPTION OF THE EMBODIMENTS

FIGS. 1 and 2 particularly show a filter cartridge 10 having a looped ultrafiltration membrane nylon material 12 spirally wrapped around a central concentrate outlet tube 14 having perforations 16 with screen woven spacer material 18 to form a spirally wound concentrate channel 28 with a feed inlet 22 and a spirally wound permeate channel 30 with a concentrate outlet in the center tube 14 with the outlet 24 and with a tubular permeate outlet tube 26. As illustrated, the screen woven spacer sheet material 18 is continually wrapped to form an external wrapping around the outer ultrafiltration membrane sheet material 20 which forms the outer cylindrical surface of the filter cartridge 10 so that the filter cartridge may be snugly fit within a cylindrical container 42. As illustrated, the permeate discharge tube 26 extends within one end of the loop of the ultrafiltration membrane 12, while the other end forms the elongated, tangential, exterior feed inlet 22 of the filter cartridge. The spirally wound ultrafiltration membrane sheet material 12 and the spacers 18 are sealed by dipping into a potting resin to form end caps 34 and 36 with the permeate tube 26 extending through the end header 34 and the outlet 24 of central tube 14 extending through end header 36.

FIG. 3 shows a filter system employing the filter cartridge 10 with the external wrapping about of the screen spacer material 18 wrapped about the exterior of the filter cartridge 10 to form a snug fit within the cylindrical container 42 to form the filter apparatus, the filter cartridge is snugly positioned within the container 42 and the end caps 34 and 36 sealed to the container by the employment of an adhesive. Container 42 has a lower permeate outlet 50 to withdraw the permeate discharge from the permeate tube 26. The filter cartridge as shown is spun onto a standard screw on-type filter holder head 44 used for mounting hydraulic filters which head 44 has a concentrate outlet 46 so that concentrate discharged from the center tube 14 may be removed and has a feed inlet 48 so that a feed stream may be introduced through the head 44 and into the container 42 and hence, elongatedly and tangentially introduced into the feed inlet flow path 22 to begin its spiral passage through the filter cartridge 10. The container has a screw on-type header 45, and as illustrated, the container 42 containing the filter cartridge 10 has been screwed onto the standard filter holder head 44 with the threaded connection sealing the outlet connection between header and filter, and O-ring 38 sealing the inlet connection between the header and filter.

The filter cartridge apparatus and system and method of the invention thus provide for an economically and easily manufactured filter cartridge and apparatus which provides for an apparatus and cartridge which may be easily and safely mounted and dismounted rapidly and to provide a rapid and effective ultrafiltration apparatus particularly for hazardous fluids, such as, but not limited to printing ink waste effluent streams.

What is claimed is:

1. A filter cartridge for the separation of a feed stream into a permeate stream and a concentrate stream, the filter cartridge adapted to be inserted within a filter container and which filter cartridge comprises:
   a) a perforated center tube for the withdrawal of a concentrate stream;
   b) a spirally-wound membrane sheet material selected for the separation of the feed stream into a concentrate stream and a permeate stream, the membrane sheet material forming a closed loop at the one and other end of the membrane sheet material and wrapped spirally around the center tube;

c) a first and second porous, open spacer sheet material to separate the membrane sheet material, the first spacer sheet material within the closed loop of the membrane sheet material to form a spirally-wound permeate flow channel, and the second spacer sheet material outside of the closed loop membrane sheet material to form a spirally-wound concentrate flow channel having a tangentially, elongated feed inlet on the exterior cylindrical surface of the filter cartridge extending generally vertically the length of the filter cartridge for the tangential introduction of a feed stream into the concentrate flow channel;

d) first and second headers at the one and the other end of the spirally-wound ultrafiltration material to seal the peripheral edges of said membrane sheet materials;

e) a concentrate outlet means at one end of the center tube and extending through the first or second or both headers for the withdrawal of a concentrate stream from the center tube; and f) a permeate outlet means within the closed loop at the one end of the membrane sheet material and extending through the first or second header or both for the withdrawal of a permeate stream from the filter cartridge.

2. The filter cartridge of claim 1 wherein the membrane sheet material comprises an ultrafiltration membrane sheet material having a pore size of about 0.5 microns or less.

3. The filter cartridge of claim 1 wherein the membrane sheet material comprises a porous nylon sheet material.

4. The filter cartridge of claim 1 wherein the spacer sheet material comprises a plastic, open, porous, resilient screen-type material.

5. The filter cartridge of claim 1 wherein the permeate flow and the concentrate flow channels have a thickness of about from 5 mils to 30 mils.

6. A filter apparatus which includes a container for the filter cartridge of claim 1 and the container includes a header at one end having a screw on-type fitting for sealingly attaching the container to a filter holder.

7. The filter cartridge of claim 1 wherein the porous spacer sheet material extends about the entire cylindrical exterior surface of the filter cartridge so that the filter cartridge is adapted to be placed in a snug, fitting position within a filter container.

8. The filter cartridge of claim 1 wherein the membrane sheet material comprises on one side an ultrafiltration filter sheet material and the other side a non-porous sheet material, the sheet material connected at the one and other ends to form the closed loop sheet material for spirally winding about the center tube.

9. The filter cartridge of claim 1 wherein the headers are solid potted resin headers.

10. The filter cartridge of claim 1 wherein the permeate outlet means comprises a permeate outlet tube extending a short distance into the permeate flow channel and generally adjacent the center tube and at the one end of the closed loop of the membrane sheet material.

11. A method of manufacturing a spirally-wound filter cartridge, which method comprises:

a) forming a closed loop of a membrane sheet material so as to form a loop at the one end and the other end;

b) inserting a first porous spacer separating sheet material within the closed loop of the membrane sheet material to form a permeate flow channel;

c) placing a second porous spacer sheet material adjacent the one side of the membrane sheet material to form a concentrate flow channel;

d) placing a permeate outlet tube within the loop of the membrane sheet material at the one end; and e) rolling the membrane sheet material with the outlet tube and containing therein the first spacer sheet material and the second spacer material about a perforated center tube to form spirally-wound concentrate and permeate flow channels and to form an elongated, tangential feed inlet at the other end of the loop of the membrane sheet material on the exterior surface of the filter cartridge; and f) forming potting resin end seals at each end of the spirally wound sheet material to seal the peripheral edges of the spirally-wound membrane sheet material while providing an open passageway for the center tube and the permeate outlet tube, thereby providing for a filter cartridge to be easily manufactured at low cost.

12. The method of claim 11 which includes providing additional second spacer sheet material extending out of the other end of the closed loop of the membrane sheet material and wrapping the additional spacer material about the exterior outer surface of the filter cartridge whereby the outer spacer material serves to provide for a snug fit of the filter cartridge within a filter container.

13. The method of claim 11 which includes inserting the filter cartridge within a cylindrical container to form a filter apparatus.

14. The method of claim 11 wherein the membrane sheet material has a thickness of about 1 mil to 10 mils and wherein the first and second spacer sheet material has a thickness of about 5 mils to 30 mils.

15. The method of claim 11 wherein the membrane sheet material has an average pore size of about 0.5 microns or less.

16. The method of claim 11 wherein the membrane sheet material comprises a porous nylon ultrafiltration sheet material.

17. The method of claim 11 wherein the membrane sheet material comprises a single sheet of ultrafiltration membrane sheet material sealingly closed at the one or other end to form a closed loop.

18. The spirally-would filter cartridge produced by the method of claim 11.

19. A method of separating a feed stream in a spirally-wound membrane filter cartridge into a concentrate stream and a permeate stream and which method comprises:

a) introducing the feed stream tangentially into the open, elongated feed passage on the exterior outer surface of a spirally-wound filter cartridge of claim 1 so that the feed stream spirally winds radially inwardly within the filter cartridge toward a central loop at the end thereof adjacent the perforated center tube;

b) withdrawing from the closed loop at the one end of the membrane sheet material a permeate stream; and c) withdrawing from the center tube a concentrate stream.

20. The method of claim 19 wherein the feed stream comprises a solvent-based waste effluent stream from a printing press ink blanket.

21. A filter apparatus which comprises:
a) the filter cartridge of claim 1;
b) a container for the filter cartridge having a one end and an other end, the container having at the one end a screw-on header sealingly secured to one end of the filter cartridge and having a central concentrate outlet to receive concentrate from the central concentrate outlet of the filter cartridge and having an inlet for the introduction of a feed stream into the container and into the feed inlet of the filter cartridge; and
c) the container sealingly secured at the other end to the other end of the filter cartridge and having a central permeate outlet to receive permeate from the permeate outlet means of the filter cartridge.

22. A filter system which comprises:
a) the filter apparatus of claim 21; and
b) a filter holder head means to mount the filter apparatus which filter holder means comprises a screw-on thread means to receive the screw-on header of the container, and which filter holder means includes a concentrate outlet to receive the concentrate stream from the filter cartridge and a feed inlet to receive a feed stream for introduction into the feed inlet of the filter cartridge and means to seal the one end of the container to the filter holder means.

* * * * *